United States Patent
Grund-Pedersen

(10) Patent No.: US 7,993,141 B2
(45) Date of Patent: Aug. 9, 2011

(54) INTERVENTIONAL SIMULATOR SYSTEM

(75) Inventor: Jan Grund-Pedersen, Kullavik (SE)

(73) Assignee: Mentice AB, Gothenberg (SE)

( * ) Notice: Subject to any disclaimer, the term of this patent is extended or adjusted under 35 U.S.C. 154(b) by 1085 days.

(21) Appl. No.: 10/538,005

(22) PCT Filed: Dec. 3, 2003

(86) PCT No.: PCT/SE03/01892
§ 371 (c)(1),
(2), (4) Date: Dec. 19, 2006

(87) PCT Pub. No.: WO2004/051603
PCT Pub. Date: Jun. 17, 2004

(65) Prior Publication Data
US 2007/0141543 A1 Jun. 21, 2007

Related U.S. Application Data

(60) Provisional application No. 60/430,364, filed on Dec. 3, 2002.

(30) Foreign Application Priority Data

Dec. 3, 2002 (SE) .................................. 0203569

(51) Int. Cl.
G09B 23/28 (2006.01)
(52) U.S. Cl. ...................................... 434/272
(58) Field of Classification Search .................. 434/262, 434/272
See application file for complete search history.

(56) References Cited

U.S. PATENT DOCUMENTS

| 3,426,448 | A | * | 2/1969 | Sarnoff ........................ 434/262 |
| 4,907,973 | A | | 3/1990 | Hon |
| 5,380,307 | A | | 1/1995 | Chee et al. |
| 5,805,140 | A | | 9/1998 | Rosenberg et al. |
| 5,828,197 | A | | 10/1998 | Martin et al. |
| 5,882,206 | A | | 3/1999 | Gillio |
| 5,987,960 | A | | 11/1999 | Messner et al. |
| 6,038,488 | A | | 3/2000 | Barnes et al. |
| 6,106,301 | A | * | 8/2000 | Merril ........................... 434/262 |
| 6,191,796 | B1 | | 2/2001 | Tarr |
| 6,267,599 | B1 | | 7/2001 | Bailey |

(Continued)

FOREIGN PATENT DOCUMENTS

EP     0970714     1/2000
(Continued)

OTHER PUBLICATIONS

International Search Report.
(Continued)

Primary Examiner — Kesha Y. Frisby
(74) Attorney, Agent, or Firm — Harness, Dickey & Pierce, P.L.C.

(57) ABSTRACT

The present invention relates to an interventional procedure simulation system, comprising a control unit and an interface unit, said control unit communication with said interface unit to simulate handling of at least one instrument interfaced by said interface unit. The instrument is a self expanding tool inserted inside a simulated vessel and simulated with respect to a set value representing a stiffness of said vessel, a rest diameter of said self expanding tool, a vessel initial inner diameter and spring constant for said tool.

7 Claims, 6 Drawing Sheets

U.S. PATENT DOCUMENTS

| | | |
|---|---|---|
| 6,443,735 B1 | 9/2002 | Eggert et al. |
| 6,470,302 B1 | 10/2002 | Cunningham et al. |
| 6,538,634 B1 | 3/2003 | Chui et al. |
| 6,773,263 B2 | 8/2004 | Nicholls et al. |
| 6,785,572 B2 | 8/2004 | Yanof et al. |
| 6,857,878 B1 | 2/2005 | Chosack et al. |
| 6,929,481 B1 * | 8/2005 | Alexander et al. ............ 434/262 |
| 6,939,138 B2 | 9/2005 | Chosack et al. |
| 7,056,123 B2 | 6/2006 | Gregorio et al. |
| 7,156,664 B2 | 1/2007 | Wallaker |
| 7,191,110 B1 | 3/2007 | Charbel et al. |
| 7,371,067 B2 | 5/2008 | Anderson et al. |
| 2001/0016804 A1 | 8/2001 | Cunningham et al. |
| 2001/0055748 A1 | 12/2001 | Bailey |
| 2002/0137014 A1 | 9/2002 | Anderson et al. |
| 2002/0168618 A1 | 11/2002 | Anderson et al. |
| 2003/0069719 A1 | 4/2003 | Cunningham et al. |
| 2004/0015070 A1 | 1/2004 | Liang et al. |
| 2004/0234933 A1 | 11/2004 | Dawson et al. |
| 2006/0127864 A1 | 6/2006 | Ohlsson |
| 2006/0234195 A1 | 10/2006 | Grund-Pedersen |

FOREIGN PATENT DOCUMENTS

| | | |
|---|---|---|
| JP | 8030185 | 2/1996 |
| JP | 10-094519 | 4/1998 |
| JP | 2000-342692 | 12/2000 |
| JP | 2001-046496 | 2/2001 |
| WO | WO 99/39317 | 8/1999 |
| WO | WO 01/78039 A2 | 4/2001 |
| WO | WO 01/56491 | 8/2001 |
| WO | 01/88882 A2 | 11/2001 |
| WO | WO 02/059859 | 8/2002 |
| WO | WO 02/070980 | 9/2002 |

OTHER PUBLICATIONS

Japanese Office Action dated Feb. 10, 2009 in Japanese Patent Application No. 2004-557051.

T. Yamaguchi, *Computational Biomechanics Simulation as a Means of Life Sciences*, Journal of the Japan Society for Simulation Technology, Dec. 1999, vol. 18, No. 4, (with English translation of Abstract).

S. Guo, *A Study of Active Catheter System*, Journal of Japanese Robotics Society, Sep. 1996, vol. 14, No. 6 (with English translation of Abstract).

Tao Bo, *Compression of Microvascular Network Image Based on Description*, China Academic Journal Electronic Publishing House, (Feb. 15, 1996) and English translation thereof.

International Search Report for PCT/SE 2003/001890 dated Feb. 18, 2004.

International Search Report for PCT/SE 2003/001891 dated Apr. 15, 2004.

International Search Report for PCT/SE 2003/001893 dated Feb. 18, 2004.

Office Action dated May 26, 2010 in co-pending U.S. Appl. No. 10/538,011.

* cited by examiner

INTERVENTIONAL SIMULATOR SYSTEM

PRIORITY STATEMENT

This application is a National Phase entry of PCT Application No. PCT/SE03/01892, filed on Dec. 3, 2003, which claims priority to U.S. Provisional Application No. 60/430,364, filed on Dec. 3, 2002 and Sweden Application No. 0203569-9, filed on Dec. 3, 2002.

TECHNICAL FIELD OF THE INVENTION

The present invention relates to a computerized apparatus for simulating an interventional operation, and in particular the using special instruments.

BACKGROUND OF THE INVENTION

Principles of adult education, tenets of experiential learning, and theories addressing the development of expertise have all underscored the critical role experience plays in the learning process. State-of-the-art simulations can be successfully included in contemporary surgical and medical education to offer trainees and practicing physicians the requisite learning experiences based on these educational underpinnings. All learners can be offered opportunities to acquire the essential skills and to achieve specified competency levels based on standardized learning experiences. Simulations can be used to facilitate learning through the evaluation of performance and provision of immediate, individualized, and detailed feedback. Simulations offer controlled settings that allow repetition until the defined performance levels are achieved, decrease stress levels of learners, increase the confidence levels of learners, and increase safety in real settings by assuring the achievement of technical competence prior to work on patients. Practicing physicians can improve their skills and can learn new procedures emerging as a result of advances in science and technology through educational interventions involving the use of simulations. In addition, the use of simulations can help address practical issues, such as the demands on faculty time, by providing trainees the opportunities for independent learning and practice. The current emphasis on accountability and on assurance of the quality of health care may also be addressed through the use of such simulations and data on outcomes can be used to assure the public of the competence of physicians.

Simulations should be considered an essential part of every contemporary educational program that addresses technical skills development. They can be used to ensure effective teaching and learning, to provide valid and reliable means of assessment of the skills of learners, to yield information on specific weaknesses that require improvement, and to create individual proinstruction sets of the technical ability of learners. In order to achieve the desired results, specific curricula should be developed based on principles of adult education, experiential learning, and effective feedback. Such simulations may also be used in programs of continuing professional education and certification. The initial investment of resources needed for the development and acquisition of simulations and for the creation of training programs that incorporate them effectively in educational models is readily offset by the numerous advantages resulting from expeditious performance of procedures in the operating room, enhancement of patient safety, and decrease in the faculty time needed to teach learners various technical skills. Such simulations may also be used to assess the effectiveness of educational efforts and even to select individuals for training. Thus, the simulations have the potential to make a major impact on programs of surgical and medical education of the future.

As a result of the rapid developments within the computer technique, simulations, especially for the purpose of surgical and medical education, have improved considerably. However, the presently known apparatus and methods do not allow a full range simulation of different instruments used.

Prior art does not suggest or give a hint for simulating different instruments according to the present invention.

SUMMARY OF THE INVENTION

The main object of the preferred embodiment of the invention is to present a novel and effective method and system for a real-time simulation of self expanding instruments, preferably in cardiovascular or endovascular diagnostic or interventional procedures.

Thus, an interventional procedure simulation system is provided comprising a control unit and an interface unit, the control unit communicating with the interface unit to simulate handling of at least one instrument interfaced by the interface unit. The instrument is a self expanding tool inserted inside a simulated vessel and simulated with respect to a set value representing an stiffness of the vessel, a rest diameter of the self expanding tool, a vessel initial inner diameter and spring constant for the tool. In one preferred embodiment, the instrument is a stent. In another preferred embodiment, the instrument is a distal protection device. Preferably, the distal protection device comprises a substantially double cone attached at two ends to a wire, and covered by a sheath. A distal part of one cone is a net for simulating catching particles that can be set free during an intervention simulation.

BRIEF DESCRIPTION OF THE DRAWINGS

In the following, the invention will be further described in a non-limiting way with reference to the accompanying drawings in which.

DETAILED DESCRIPTION OF THE EMBODIMENTS

Figure 1:
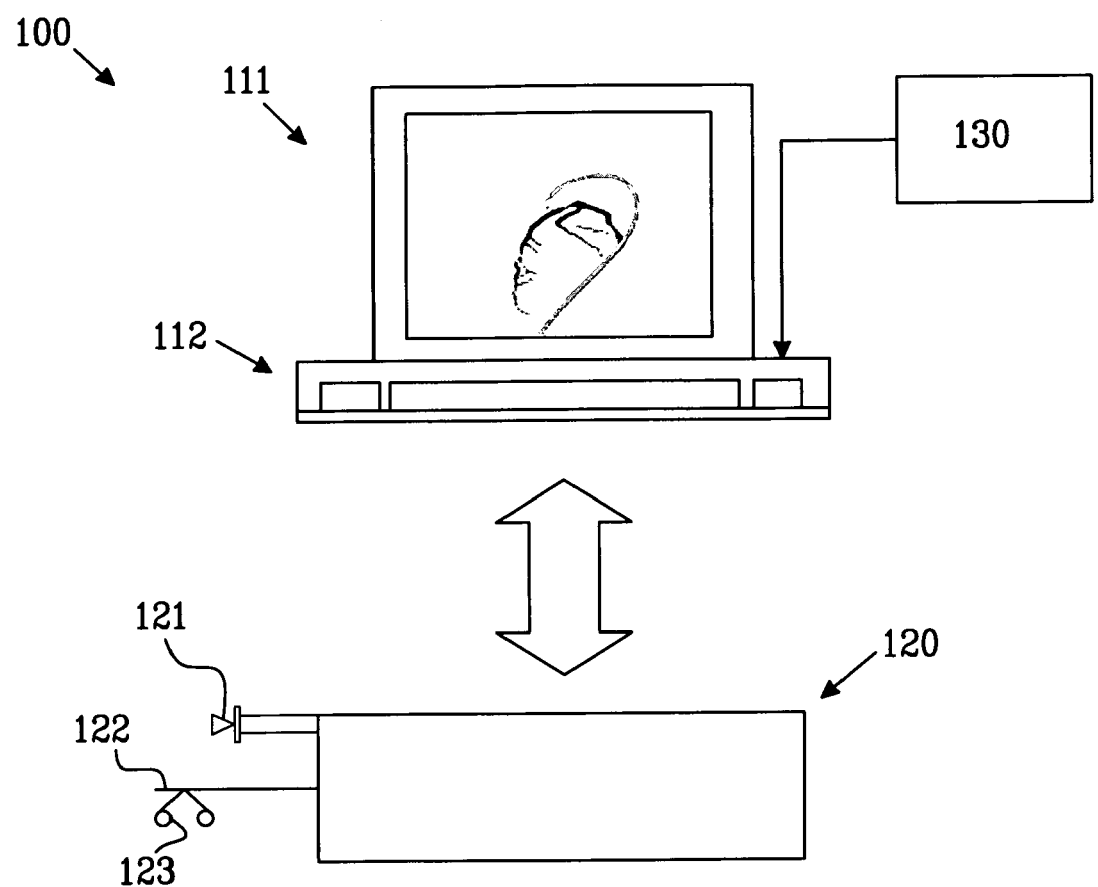
FIG. 1 schematically illustrates a block diagram according to one embodiment of the invention.

One exemplary embodiment of a simulation apparatus according to the invention is schematically illustrated in FIG. 1. The apparatus 100 comprises a computer unit 110 and an interface device 120. The computer unit 110 can be a conventional PC or similar, or a unit integrated with the interface device 120. The computer unit according to this embodiment communicates with a display unit 111, an input device 112 such as a keyboard and a mouse, and a communication interface (not shown).

The interface device 120, described in a parallel application, entitled "AN INTERVENTIONAL SIMULATION DEVICE" (SE 0203568-1) by the same applicant and incorporation herein through reference, is arranged to receive a number of instruments 121-123. The control system, described in a parallel application, entitled "AN INTERVEN- TIONAL SIMULATION CONTROL SYSTEM" (SE 0203567-3) by the same applicant and incorporation herein through reference, is arranged to simulate interventional procedures.

However, the invention is not limited to a system comprising the above mentioned control system and interface devices. The teachings of the invention can be employed in any system able of simulation of self-expanding instruments.

A 3D geometry can be constructed in different ways:
They can be modeled in a 3D modeling software, i.e. from scratch using anatomy books, video clips, etc as references only.
They can be reconstructed from real patient data, e.g. obtained through scans 130 with CT, MRI, Ultrasound, fluoroscope, etc.

Figure 2:
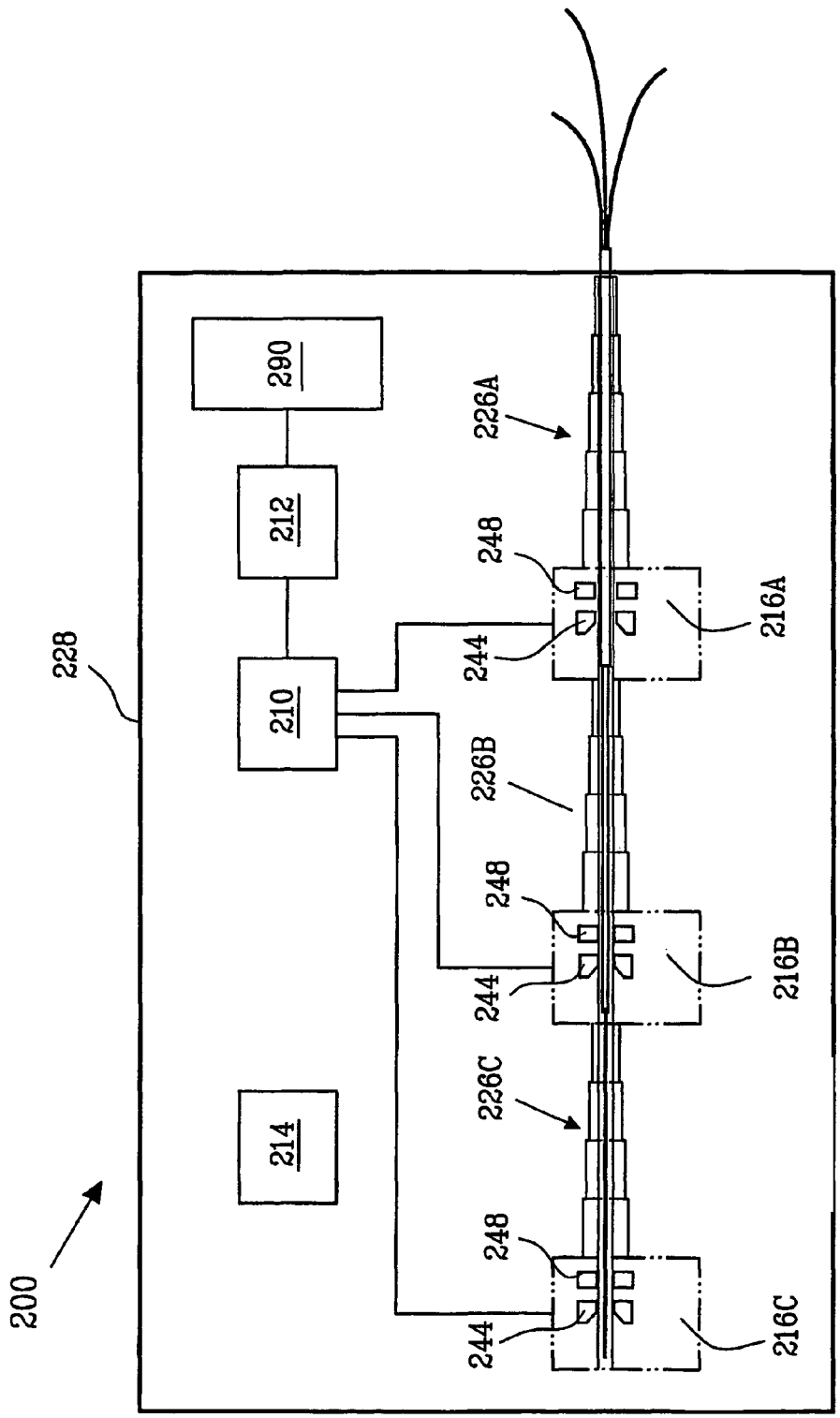
FIG. 2 is a schematic view of an interface device.

An interface device 200, schematically illustrated in FIG. 2, as a preferred embodiment, is arranged to receive a number of instruments, dummies or real, preferably at least two instruments. The device comprises a number of moveable carriages 216A-216C corresponding to the number of the instruments, a common track 220, and an interconnecting member 226 provided as a telescopic tube. The interconnecting member 226 interconnects the carriages 216A-216C serially. Each carriage is provided with an opening for enabling reception of the instruments. Each carriage 216A-216C further comprises members to receive and lock at least one of the instruments, and members for receiving a movement from the instrument and generating a force, which is fed back to the instrument with respect to a simulation characteristic. Preferably, each carriage comprises a detecting arrangement for detecting the type of the instrument inserted through the interconnecting member. The interface device is connected to the control unit (PC) to measure the movement of each carriage and regulate the movement by means of a speed regulator and a distance regulator. Each carriage is connected with a gear belt transmission for driving along the track 220. Each carriage is provided with a crank block, which is arranged on a torque wheel. The crank block is provided with a mating surface, which is pressed towards a collet that grips the instrument wire. Moreover, each carriage is arranged with an outlet, which is provided with a detecting member, which detects presence of an instrument in the carriage. The detecting member is arranged to detect the thickness of each instrument. The optical sensor detects presence of an instrument in the carriage. The control unit measures a longitudinal movement and a movement of rotation, of the instrument and gives force-feedback in the longitudinal direction and in the direction of rotation, of the instrument according to received force and torque. A locking member is arranged to clamp an instrument, which instrument is attached to a central wall. The locking member comprises a torque wheel, which is arranged in the central wall. The crank block is provided inside the torque wheel, which crank block moves in longitudinal direction. The crank block is fixed in the direction of rotation.

The system simulates the way different types of self-expanding tools behave. The self-expanding tool consists of the tool itself and a covering sheath (tube). As the sheath is retracted, the tool itself expands to its "natural" shape. In some cases, it is also possible to push a sheath back to cover the tool again.

Example 1

Self-Expandable Stent

The stent is pressed on top of a hollow tube, which runs on top of a wire, and covered, by a sheath. The stent is not attached to the underlying tube. When the covering sheath is retracted, the stent opens gradually and takes a predefined diameter (in a vessel this diameter is the maximum, and will be less if the vessel walls press the stent together). When the sheath is fully retracted, the stent will be totally detached from the sheath and underlying tube, and pressed against the vessel walls. There is now no way of retrieving the stent itself.

Example 2

Distal Protection Device (DPD)

Figure 3:
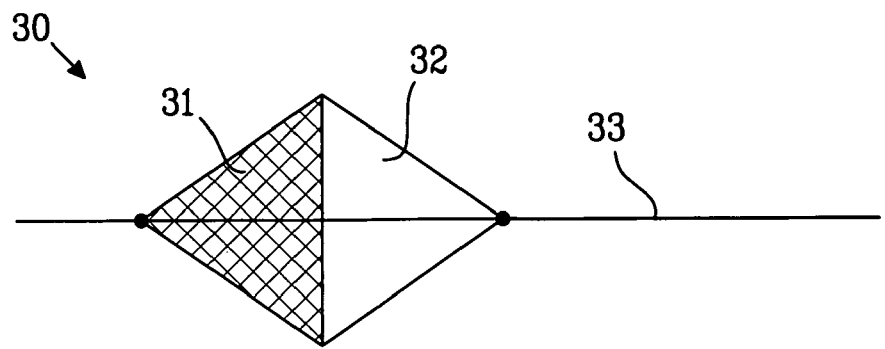
FIG. 3 is a schematic view of a simulated instrument.

A DPD 30 as illustrated in FIG. 3, is a "double cone" 31 and 32 attached at two ends to a wire 33, and covered by a sheath (not shown). The distal part of the "cone" is a fine net 31, which is attended to catch particles that can be set free during an intervention. The proximal part of the "cone" is totally open. When the sheath is retracted, the cone takes its "natural" shape—widest at the middle. Since it is attached to the underlying wire, the sheath can be pushed back to again cover the "cone".

Figure 4:
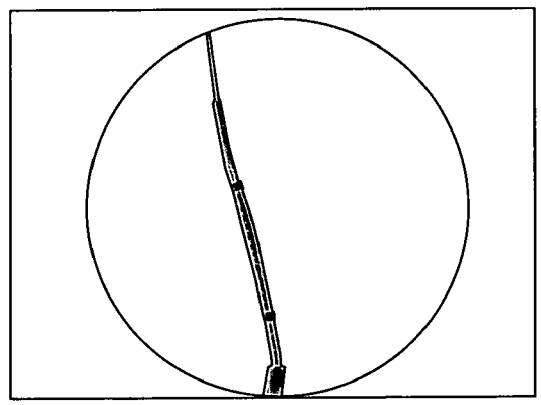
FIGS. 4-6 are fluoroscopic images illustrating sequences using a balloon and stent.
Figure 5:
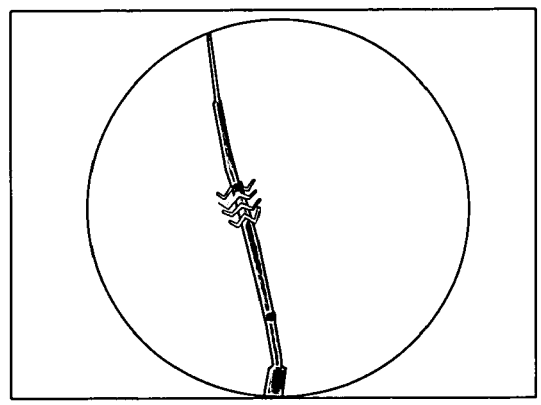
Figure 6:
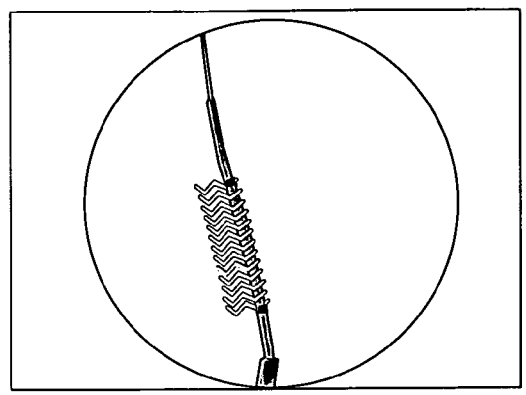
Figure 7:
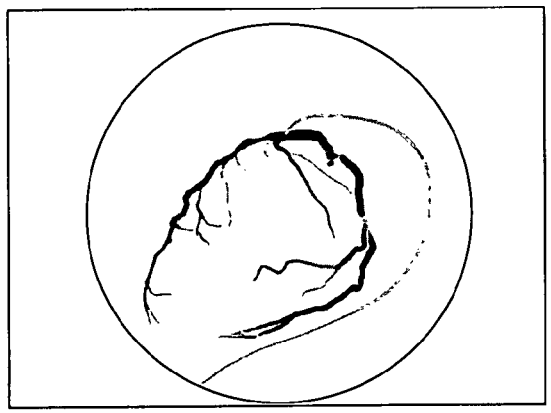
FIGS. 7-10 are fluoroscopic images illustrating sequences using a guide catheter.
Figure 8:
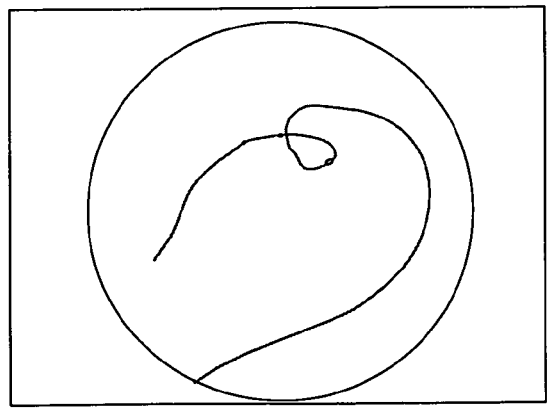
Figure 9:
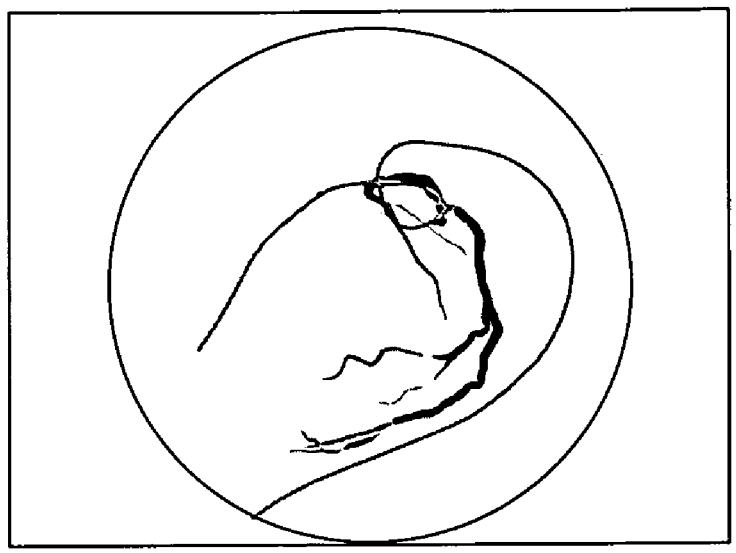
Figure 10:
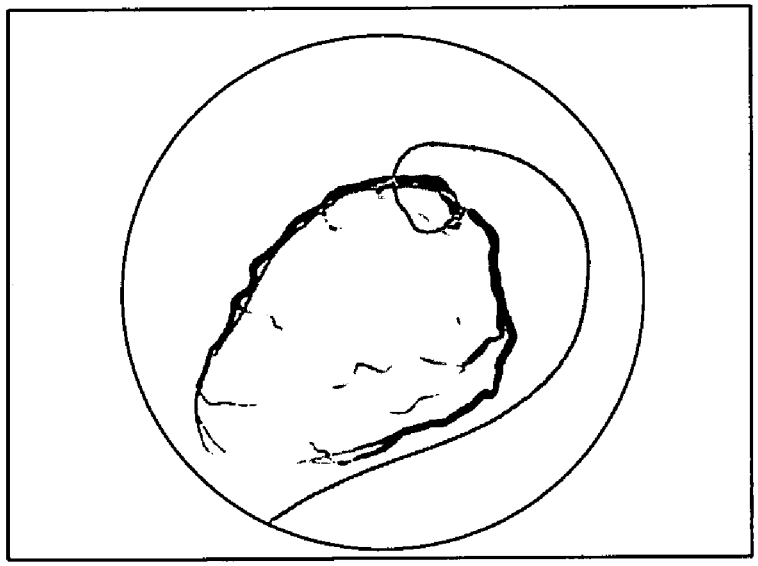

In the following, the invention will be described in conjunction with a number of non-limiting examples:

FIGS. 4-6 illustrate sequences of a self-expanding instrument, in this example a self-expanding stent. In case of self-expandable stents, they are covered with a sheath, which is then retracted and the stent expands to a given size (but as it hits the vessel wall the final size will be dependent of the vessel "stiffness" and the properties of the stent itself). The properties of the stent, both visually, the way it expands and the effects it has on the vessel are simulated. The vessel can also be post dilated with a "regular" balloon afterwards. In FIG. 4 a self-expandable stent is in place in a vessel but not deployed, in FIG. 5 the sheath covering the stent is partially retracted and in FIG. 6 the sheath is fully retracted and stent deployed (not connected to the tool). The simulator program has a number of initial values: a rest expansion diameter for the self expanding instrument expansion-diameter, the vessel initial inner diameter (at the simulated part), spring constant for the self expansion instrument and a vessel stiffness. These parameters determine how the simulator sets the boundaries for the expansion of the instrument and (simulated part) of the vessel. If a sheath is used, also its diameter must be initiated.

A balloon and a stent can also be used in same way; the balloon (also for the stent) interacts with a vessel, which expands. The blood flow changes, and the contrast when injected. The stent is simulated in such a way that it is visible and stays in place as the balloon is deflated. It is also possible to enter with a larger balloon and inflate it again. This will influence both the stent and the vessel, so-called post dilatation. It is also possible to first inflate a balloon, before using a stent, so-called pre dilatation. Simulation is achieved by using force feedback, whereby a tight lesion is felt, when going through with a "large" balloon.

The procedure illustrated in FIGS. 7-10, is done in such a way that first a guide catheter and guide wire are advanced to access either the right or left coronary vessel tree. Contrast is then injected through the catheter to locate the lesion/stenosis. The view can be changed to obtain a perfect visualization of the lesion. Images can also be exported to be used by a separate QCA (Qualitative C Assessment) program, for length and width measurement. Then the user can decide what sizes of balloon/stent he/she wants to use. (Typically, some cine loops are recorded before and after balloon dilatation/stenting.) A thin guide wire (coronary wire) is first advanced through the catheter and into the vessel tree. The tip of the wire can be shaped in an angle (user selectable), and the wire is then steered through the vessel tree by rotating the wire, and pulling/pushing to find the right way past the lesion. The balloon/stent is then advanced on top of the wire, and positioned in the right place using the radioopaque markers. Contrast can be injected to see that it is positioned in the right place. Finally, the balloon/stent is inflated, held for some time, and then deflated. All the steps are simulated and can be performed as in real life.

Figure 11:
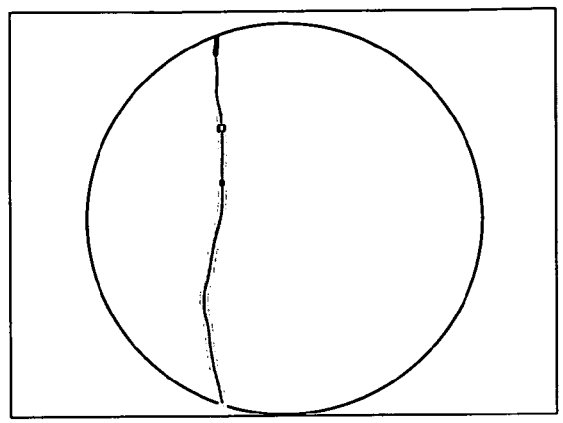
FIGS. 11-13 are fluoroscopic images illustrating sequences using a distal protection.
Figure 12:
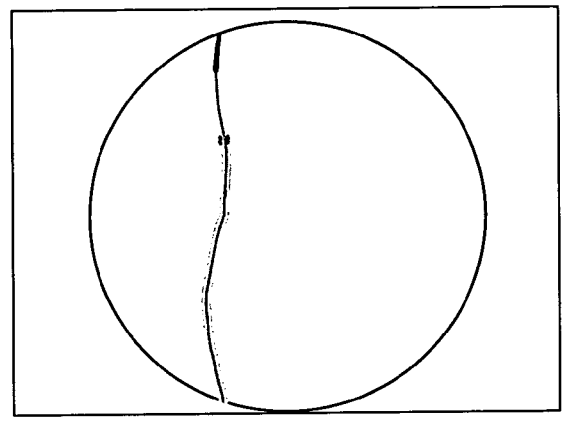
Figure 13:
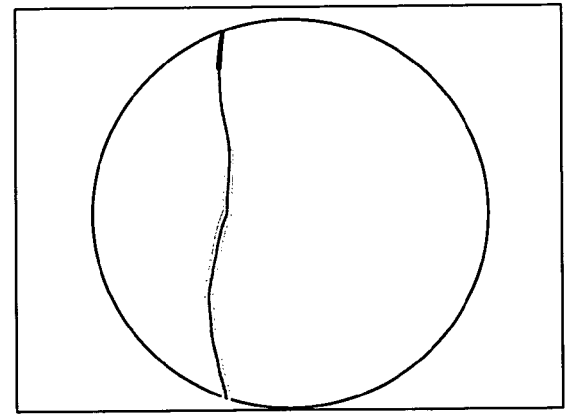

A distal protection device stops emboli from moving further and block very small vessels (which can be devastating in the brain). A filter "basket" can then be used attached to a wire and at first covered with a sheath. The wire and sheath is positioned past the lesion, and then the sheath is retracted, leaving the basket as a protection for when the lesion is dilated. Afterwards a recovery sheath is advanced to close the basket and the two are together retracted. The behavior of the distal protection device is simulated, comprising how one handles it and the visible characteristics. Other types of protection devices are also possible to simulate, for example balloons that block the flow while dilating. Sequences are illustrated in FIGS. 11-13, showing:

FIG. 11 A distal protection device is in place in a vessel, sheath-covering filter partially retracted;

FIG. 12 the sheath is retracted, markers at the "base" of filter starting to "expand";

FIG. 13 the sheath retracted even more.

Note that the filter itself, in this case, is not visible on a fluoroscopic image. Only the marker points are. The sequence above can be reversed, since the filter stays connected to the wire.

The invention is not limited to the shown embodiments but can be varied in a number of ways without departing from the scope of the appended claims and the arrangement and the method can be implemented in various ways depending on application, functional units, needs and requirements etc.

The invention claimed is:

1. An interventional procedure simulation system, comprising:
    a control unit and an interface unit, said control unit communicating with said interface unit to simulate handling of at least one instrument interfaced by said interface unit,
    wherein said instrument is a self expanding tool inserted inside a simulated vessel, and
    the control unit is programmed to simulate said instrument with respect to an initial set value representing a stiffness of said vessel, a rest expansion diameter of said self expanding tool, an initial inner diameter of said vessel and a spring constant for said tool.

2. The system of claim 1, wherein said instrument is a stent.

3. The system of claim 1, wherein said instrument is a distal protection device.

4. The system of claim 3, wherein said distal protection device comprises a double cone attached at two ends to a wire.

5. The system of claim 4, wherein a distal part of one cone is a net for simulating catching particles that can be set free during an intervention simulation.

6. A method of simulating an interventional procedure simulation system including a control unit and an interface unit, said control unit communicating with said interface unit to simulate handling of at least one instrument interfaced by said interface unit, the method comprising:
    providing said at least one instrument as a self expanding tool inserted inside a simulated vessel; and
    simulating said at least one instrument with respect to a set value representing a stiffness of said simulated vessel, a rest diameter of said self expanding tool, an initial inner diameter of said simulated vessel and a spring constant for said self expanding tool.

7. An interventional procedure simulation system, comprising:
    a control unit communicating with said interface unit to simulate handling of at least one instrument interfaced by said interface unit, wherein said at least one instrument is a self-expanding tool inserted inside a simulated vessel, and the control unit is programmed to simulate said instrument with respect to an initial set value representing an stiffness of said simulated vessel, a rest expanding diameter of said self-expanding tool, an initial inner diameter of said simulated vessel, and a spring constant for said self-expanding tool; and
    an interface unit, said interface unit including a detecting member adapted to detect a thickness of said at least one instrument, and an optical sensor adapted to detect the presence of said at least one instrument in the interface unit,
    wherein said control unit is further programmed to measure a longitudinal movement and a movement of rotation of said at least one instrument and providing a force-feedback in a longitudinal direction and in a direction of rotation of said at least one instrument according to a received force and torque.

* * * * *